TELEVISION RELAY SYSTEM

Filed March 9, 1955 4 Sheets-Sheet 1

INVENTOR
JOHN HAYS HAMMOND, JR.
BY [signature]
ATTORNEY

TELEVISION RELAY SYSTEM

Filed March 9, 1955

INVENTOR
JOHN HAYS HAMMOND, JR.
BY
ATTORNEY

INVENTOR
JOHN HAYS HAMMOND, JR.
BY
ATTORNEY

Feb. 24, 1959 J. H. HAMMOND, JR 2,875,436

TELEVISION RELAY SYSTEM

Filed March 9, 1955

4 Sheets-Sheet 4

INVENTOR
JOHN HAYS HAMMOND, JR.
BY
ATTORNEY

United States Patent Office 2,875,436

Patented Feb. 24, 1959

2,875,436

TELEVISION RELAY SYSTEM

John Hays Hammond, Jr., Gloucester, Mass.

Application March 9, 1955, Serial No. 493,260

8 Claims. (Cl. 343—202)

This invention relates to television and more particularly to television relay systems for transmitting television-type signals by radio over long distances.

This application is a continuation in part of my co-pending application Ser. No. 414,055, filed March 4, 1954, for Television Relay System.

An object of this invention is to provide a system by which television programs can be sent from a master station simultaneously to any number of distant broadcasting stations by a radio carrier wave instead of by transmission over microwave links, coaxial cables, or by the physical transportation of recordings on film, tape, or wire.

The invention provides a method of sending programs to the various stations of a network which is much less expensive than by the use of micro-wave-link systems or cables, and the interruptions caused by equipment failure, so common with microwave links, is eliminated. The invention also provides means for relaying television programs over bodies of water and mountainous terrain where the installation of microwave links or cables would be difficult or impossible.

Other objects and advantages will be apparent as the nature of the invention is more fully disclosed.

The video and synchronization signals of standard television require a band width of from 30 cycles per second to between 3 and 4 megacycles per second. Such a wide-band modulation of a radio carrier wave necessitates that the carrier-wave frequency be sufficiently high so that the fractional radio-frequency band width is limited to practical values, generally less than 10 percent. As a consequence, the carrier-wave frequencies of standard television are restricted by the Federal Communication Commission to the radio spectrum above 50 megacycles per second. Unfortunately, however, these radio waves are in general not reflected by the ionosphere and hence are transmitted only short distances seldom exceeding line-of-sight ranges.

It is well known that radio waves having frequencies in the 10 to 30 megacycle region are strongly reflected by the ionosphere and consequently are reliably transmitted over long distances, even thousands of miles.

Television programs could be transmitted over carrier waves in the 10 to 30 megacycle range only if the modulating-frequency band width is compressed so as to limit the fractional band width of the radio emission to practical values. If the same fractional band width is permitted at a lower carrier-wave frequency as in standard television the reduction of the modulation spectrum would have to be in the same ratio as the reduction in carrier-wave frequency, and this reduction factor might be no more than two or three to effect a very considerable increase in range of transmission.

Compressing the modulation spectrum by a factor necessarily increases the time required for transmitting a program by the same factor. For example, if the carrier wave is reduced from 50 to 25 megacycles the modulation spectrum must be compressed also to one half its original width, and two hours would be required to transmit a one hour program. In order, therefore, to maintain about the same rate of flow of information as relayed from the master station to the distance local broadcasting stations as for the standard television, there must be provided means for transmitting simultaneously two or more relayed programs. If the factor of compression is two, for example, an hours program could be relayed in one hour by dividing the record into two parts and sending them simultaneously by multiplex transmission. The same rate of relaying programs could also be accomplished by sending two different programs simultaneously by the multiplex transmission of the present invention.

This invention provides means not only for compressing the modulation spectrum, but also it provides co-operating means for multiple transmission of the relayed programs so as to maintain approximately the same rate of flow of program material as for the standard television stations connected by microwave links or coaxial cables.

The complete procedure in the practice of this invention is explained in terms of steps which are briefly described below. In the first step the video, synchronization, and audio signals, as furnished by the camera when viewing a live program, are recorded on a suitable medium such as a magnetic tape driven at a suitable speed, which will be referred to as normal speed In the second step of the process the video and synchronization signals are taken from the tape or other medium when driven at a fraction of normal speed, and used to modulate a multiplex transmitter having a carrier frequency lower than would be used for direct television broadcast. The other channels of the multiplex transmitter will simultaneously transmit signals derived from one or more additional transcribers having tapes or other media driven at the fractional speed. In the third step the radio carrier is received at a distant station and the two or more compressed signals are separately derived from the multiplex transmission and recorded on tapes or other media on two or more transcribers, the tapes or other media being driven at fractional speed. In the final and fourth step of the process the program signals recovered from one of the tapes or other media while driven at normal speed, are used to modulate in the usual way a television transmitter for local broadcast. The signals derived from the other tapes or media are used successively to modulate the transmitter.

The audio signals which were recorded and compressed in step one would be transmitted to the distant station by telephone wires or by other radio channels, and recorded on the final tape in step four in proper time relation to the video signals. Since the compressed audio band width is very small compared with the video band width its transmission offers no difficulty.

The invention provides means for transmitting simultaneously a program from a central studio or from one master tape to any number of distant television stations for broadcasting to the local area served by each station. Thus a large area can be provided with television programs from one master station without the use of high cost connections between stations such as coaxial cables or microwave radio links.

The invention may be more fully explained by reference to the following description, taken in connection with the accompanying drawings in which a specific embodiment has been set forth for purposes of illustration.

Figure 8:
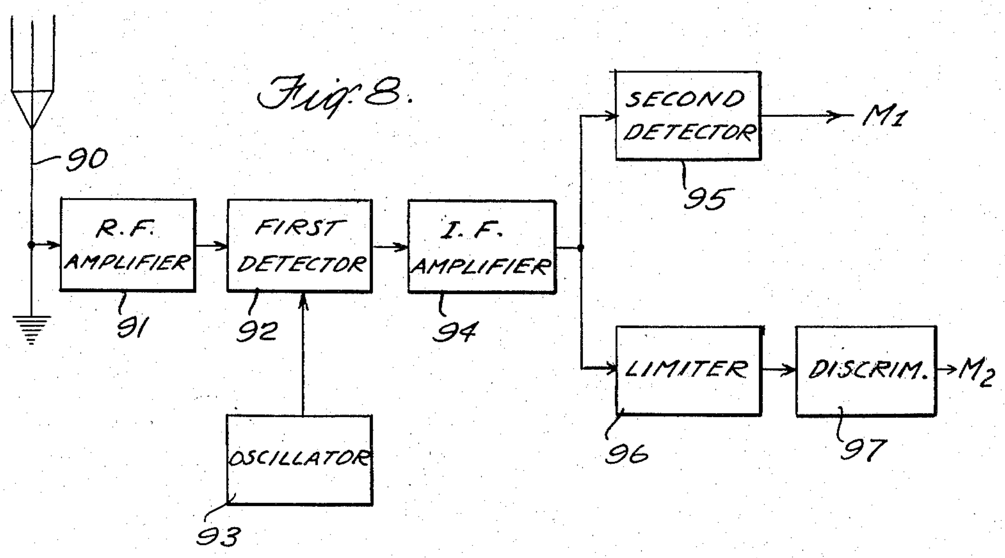
Figure 7:
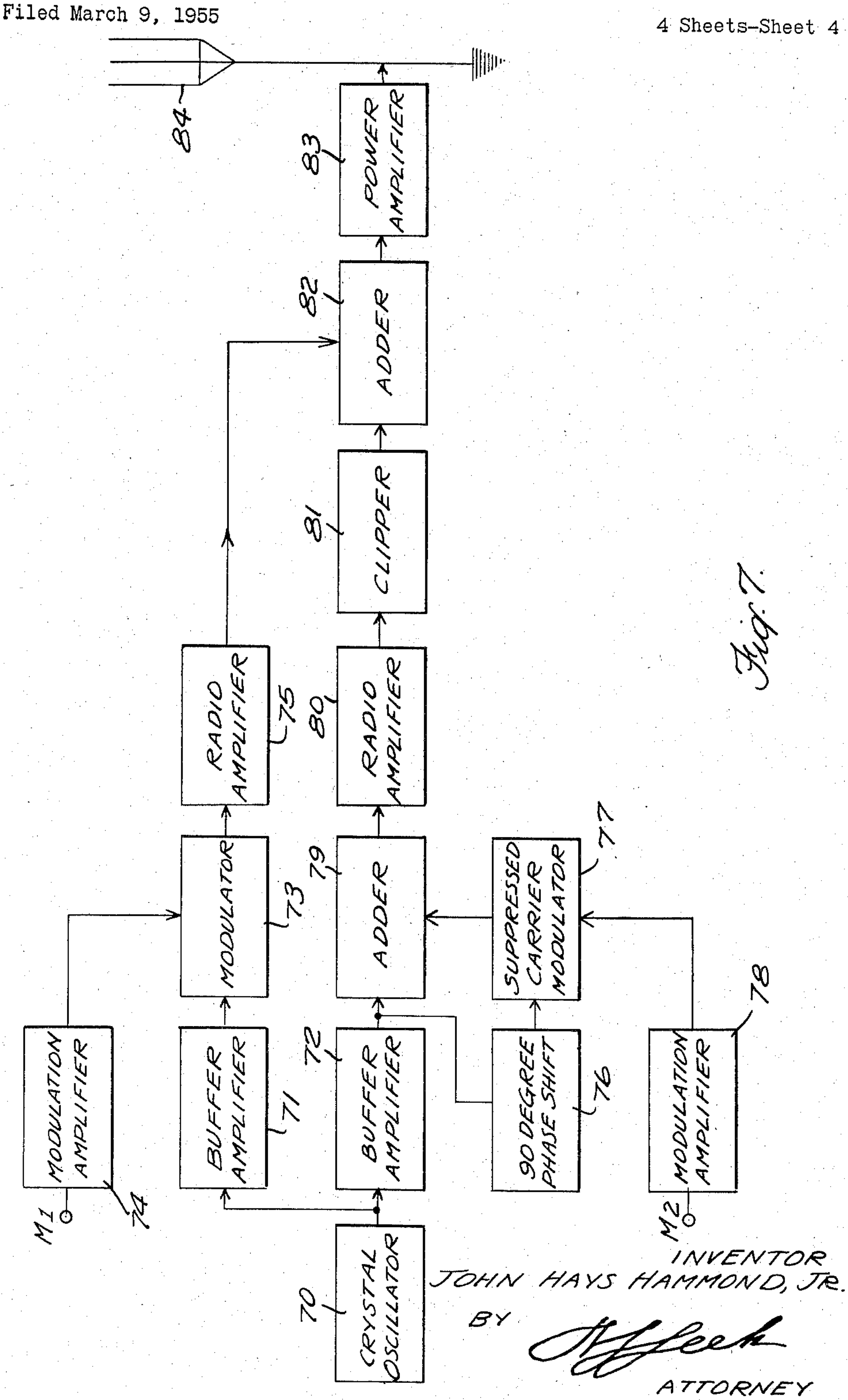

Figures 6*a* and 6*b* are vector diagrams showing amplitude and phase modulation;

Figure 7 is a block diagram showing one kind of multiplex transmitter embodying the present invention; and Figure 8 is a block diagram of one form of a receiver for multiplex transmission embodying the present invention.

In the following description parts will be identified by specific names for convenience, but they are intended to be generic in their application to similar parts.

Figure 1:
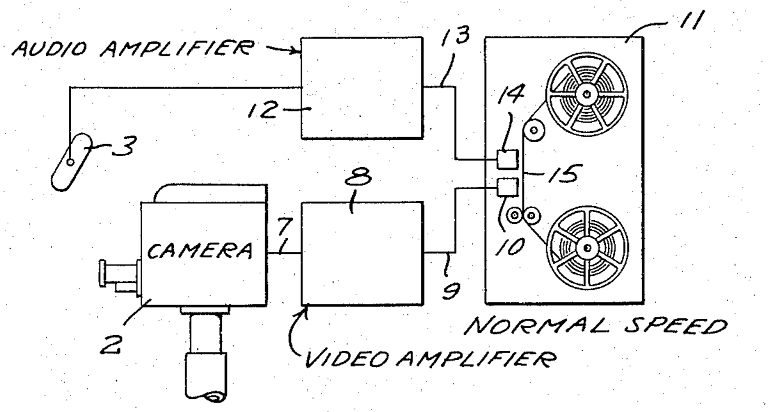
Figure 1 is a block diagram illustrating the first step of recording the video and audio signals on tape at the master station.

The first step in the practice of the invention is illustrated in Figure 1. A scene is converted into video signals by a television camera 2 of standard type. These signals, together with synchronizing pulses produced in camera 2, are conducted by line 7 to a video amplifier 8, and then by line 9 to a recording head or heads 10 of a magentic tape recorder 11. Microphone 3 provides audio signals which are amplified by audio amplifier 12. The amplified audio signals are conducted by line 13 to the recording head 14 of recorder 11. All of these signals are recorded on a magnetic tape 15 operating at a normal speed for such recording. For black and white video signals, one track may be used for the video, one track for the synchronizing signal, and one track for the sound. If color video signals are recorded at least two more tracks are required. Any known technique of recording video signals on tape may be used.

If, in the process described above, the video and synchronizing signals are recorded on separate tracks, signal-separation circuits would be included in block 8, and two lines in place of the one line 9 would conduct the two signals to two recording heads instead of the single head 10 as shown in Figure 1. In subsequent figures, as in Figure 1, the video and synchronizing signals are assumed combined and recorded in a single track but they may be recorded in separate tracks as stated in which case the same additional recording or transcribing head and separation or combining circuits would be added without affecting the basic steps involved in this invention.

Figure 2:
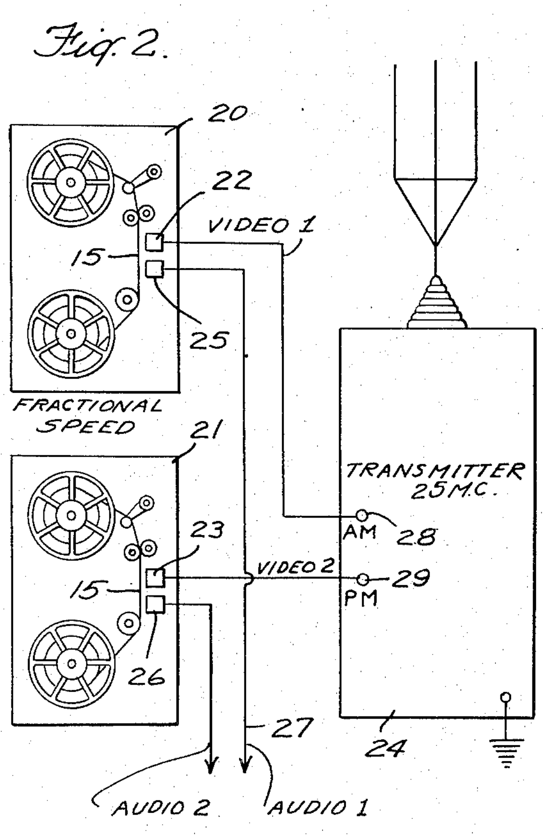
Figure 2 is a block diagram illustrating the process of transmitting the two halves of the program or two separate programs at reduced speed from the master station to the remote broadcasting station by multiplex radio transmission on a suitable low frequency radio carrier wave.

The second step in the practice of this invention is illustrated in Figure 2. Two transcribers 20 and 21 have tapes or other media on which have been recorded by the method of Figure 1 either the two halves of a program or two separate programs. The tapes or other media are driven at a fraction of normal speed and one of the two video and synchronizing signals taken from the tapes by head 22 is used to amplitude modulate, and the other taken from the other tape by head 23 is used to phase modulate a common radio carrier wave of, for example, 25 megacycles in transmitter 24. The two corresponding audio signls, reduced in frequency because of the lower speed of the tapes, are taken from the tapes by reproducing heads 25 and 26 and are conducted to telephone lines or to a second multiplex radio transmitter not shown. The operation of the transmitter 24 will be described later.

Figure 3:
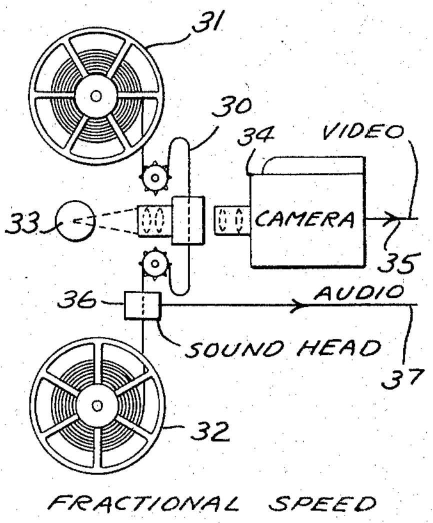
Figure 3 is a schematic diagram showing the method of obtaining the compressed video and audio signals from a moving picture film.

Figure 3 shows the method of feeding one video channel of transmitter 24 in Figure 2 when the program is recorded on moving-picture film instead of being a live program. The moving-picture film 30 is fed from reel 31 to reel 32 at the fraction of normal speed used in driving the tapes of Figure 2. A light 33 illuminates the picture on the film, an image of which is cast on the iconoscope or equivalent photo-electric transcriber contained in camera 34. The video and synchronizing signals are then supplied over line 35 to post 28 of Figure 2 or to an equivalent multiplex transmitter. The audio signal, taken from sound head 36, is fed through line 37 to the same transmitting means as for the signals over line 27 of Figure 2. A duplicate of the equipment in Figure 3 could also replace transcriber 21, or a live program could be sent by transcriber 21 along with a film-recorded program.

Steps 1 and 2 or the variation of steps 1 and 2 shown in Figure 3 take place at the master relay station.

Figure 4:
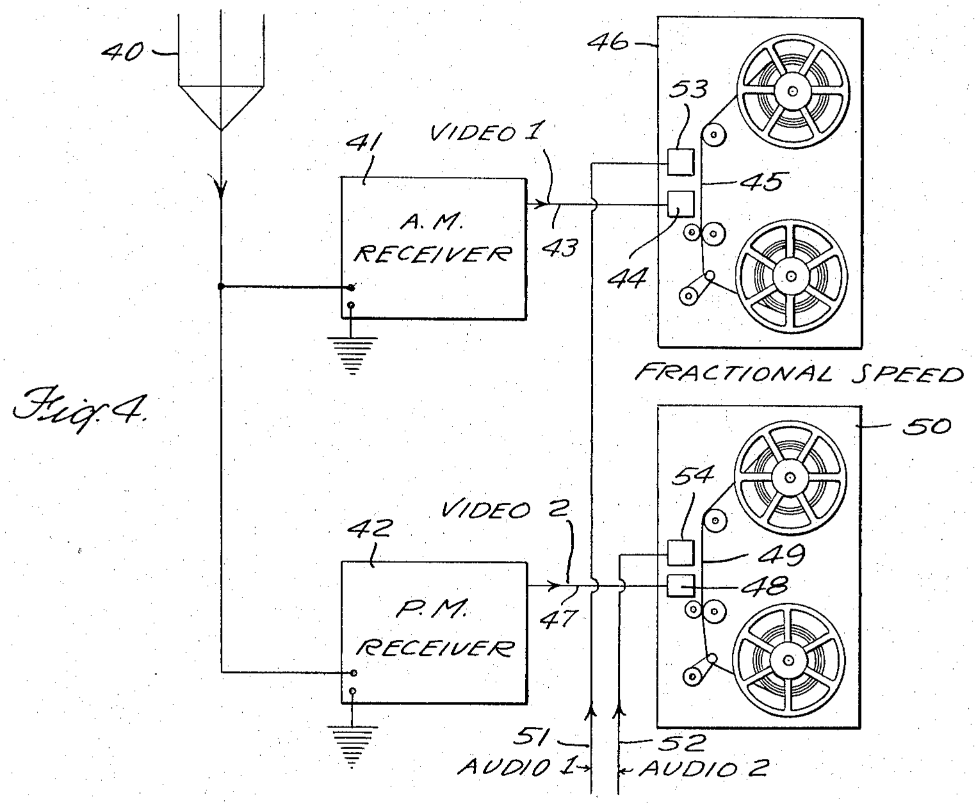
Figure 4 is a block diagram illustrating the step of receiving the program at the remote station and recording the two halves of the program or two separate programs on magnetic tape at reduced speed.

The third step in the practice of this invention is shown in Figure 4 and takes place at one of the distant receiving stations. The doubly modulated carrier wave, of say 25 megacycles, is received by antenna 40, and the two modulation signals separately derived by the two receivers 41 and 42, receiver 41 being only responsive to amplitude modulation and receiver 42 being only responsive to phase modulation. The operation of these two receivers will be described later.

The video and synchronizing signals, derived from transcriber 20 and sent by amplitude modulation, are reproduced by receiver 41 and fed over line 43 to recording head 44 of recorder 46, and recorded on tape 45 driven at fractional speed. Similarly and simultaneously the video and synchronizing signals derived from recorder 21 and sent by phase modulation, are reproduced by receiver 42 and fed by line 47 to recording head 48 and recorded by head 48 on tape 49 of recorder 50 driven at fractional speed. Thus two programs or two halves of the same program are simultaneously recorded.

The corresponding audio signals transmitted by telephone line or radio are conducted by lines 51 and 52, and recorded on the corresponding tapes by sound recording heads 53 and 54, respectively.

Figure 5:
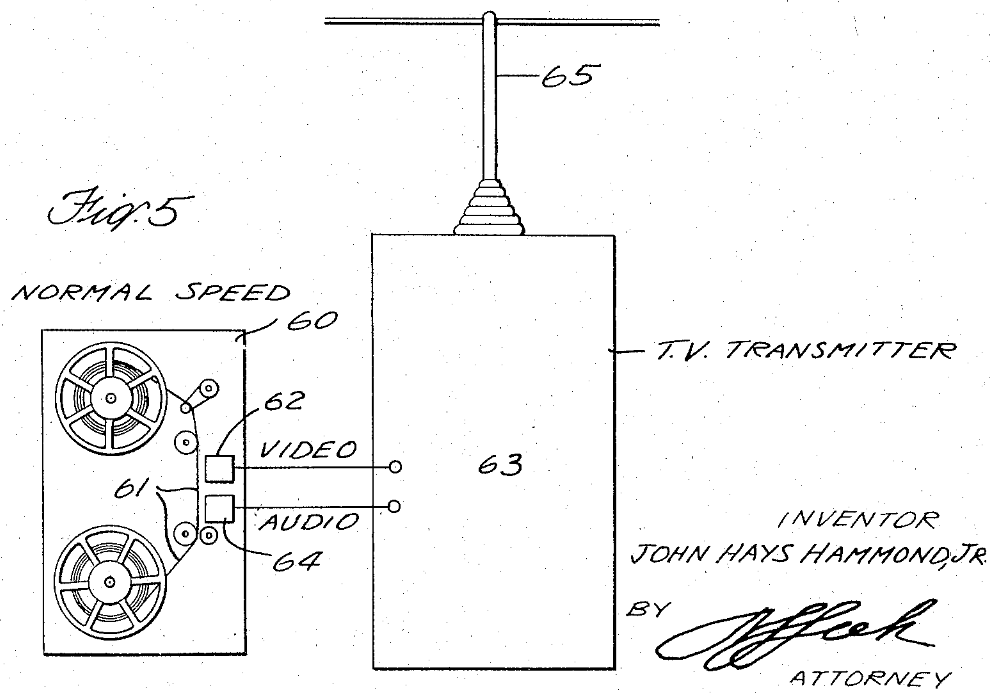
Figure 5 is a block diagram illustrating the process of broadcasting the program derived from the tape at the remote station.

The fourth and final step in the practice of this invention is illustrated in Figure 5. The tape 61, which may be either tape 45 or 49, is driven at normal speed on transcriber 60. The video and synchronizing signals, now having the original frequencies, are taken from reproducing head 62, and are fed to the television transmitter 63 to modulate the television carrier wave. The accompanying audio signals from reproducing head 64, having the original sound frequencies, are also fed to transmitter 63. The complete television program is then broadcast in the usual way by transmitter 63 and antenna 65.

Figure 6:
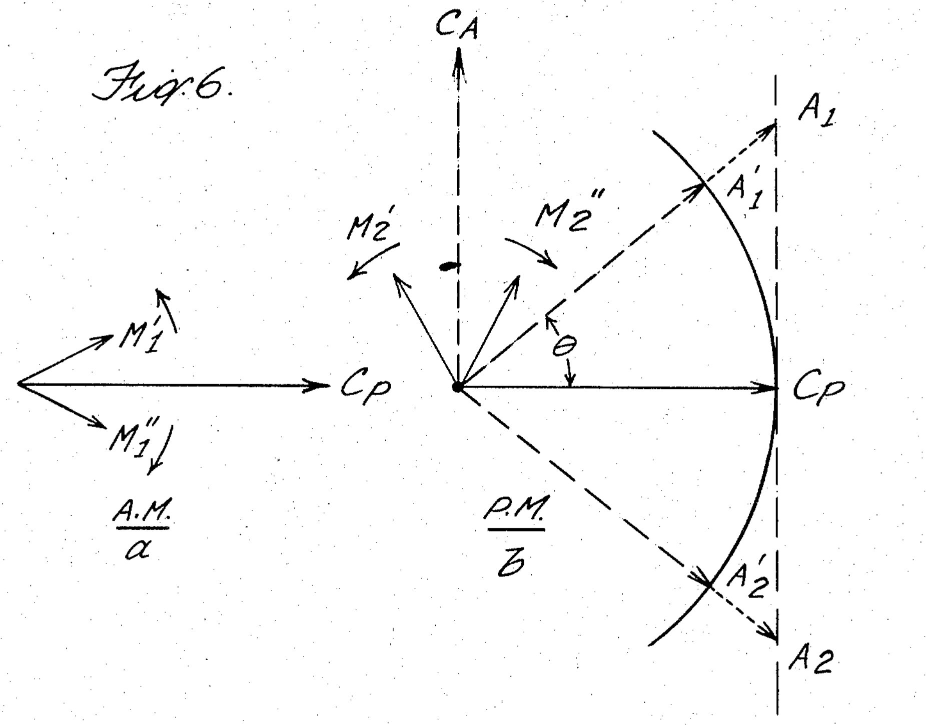

The mode of operation of the duplex transmitter of Figure 2, which represents one form of a multiplex transmission system, is explained by Figures 6 and 7. In Figure 6*a*, Cp is the vector of a carrier wave which is amplitude modulated by modulation signal $M_1$. If, for example, $M_1$ consists of a single frequency, such modulation gives rise to two equal modulation vectors $M_1^1$ and $M_1^{11}$ which rotate in opposite directions with respect to vector $C_p$ with an angular frequency equal to the angular frequency of $M_1$.

A second modulation signal $M_2$ amplitude modulates a carrier wave $C_a$ equal to carrier wave $C_p$ but differing from $C_p$ by 90° in phase. In this case, however, the carrier $C_a$ is suppressed after modulation while the modulation components $M_2^1$ and $M_2^{11}$ are retained. The carrier wave $C_p$ is then added to $M_2^1$ and $M_2^{11}$ producing a phase-modulated wave with a small amount of amplitude modulation. The vector sum wabbles through an angle of plus and minus $\theta$ degrees between the limits $A_1$ and $A_2$. A clipper or limiter is then used to maintain the amplitude at a constant value of say $C_p$, thus reducing $A_1$ and $A_2$ to $A_1^1$ and $A_2^1$, respectively. The result is a true phase-modulated carrier. The amplitude-modulated signal of Figure 6*a* is added to the phase-modulated signal of Figure 6*b*, and then amplified for radiation by the antenna.

Figure 7 shows in block form the transmitter in Figure 2 comprising elements all individually well known in the art, which when combined as shown produce the two kinds of modulation illustrated in Figure 6. A crystal oscillator 70 feeds a voltage of carrier frequency, and represented by vector $C_p$ in Figure 6*b*, to buffer amplifiers 71 and 72. The output of amplifier 71 is fed to modulator 73 which also receives modulation signal $M_1$ amplified by amplifier 74. The output of modulator 73 is an amplitude-modulated signal shown in Figure 6*a*. This signal is increased in power by the radio class B amplifier 75.

The output of amplifier 72, which corresponds to vector $C_p$ in Figure 6*b*, is shifted forward or backward in phase by 90 degrees by block 76, giving a voltage corresponding to vector $C_A$ in Figure 6*b*. This voltage is impressed upon the balanced modulator 77 upon which is also impressed the second modulating signal $M_2$ amplified by block 78. The balanced modulator 77 suppresses the carrier $C_A$ but passes on to block 79 the two side bands represented by vectors $M_2{}^{1}$ and $M_2{}^{11}$ in Figure 6*b*.

Carrier voltage $C_p$ from amplifier 72 is then added in block 79 to the two side bands supplied by block 77. This approximately phase-modulated signal is amplified in block 80 and then clipped in block 81 to give the true phase-modulated signal shown in Figure 6*b*. The phase-modulated signal and the amplitude-modulated signal are then combined by adder 82, and the combined signal is further increased in power by amplifier 83, and finally radiated by antenna 84.

The receiver, shown in Figure 8, is made up of elements all of which are individually well known in the art. An antenna 90 feeds a radio-frequency amplifier 91. The output of amplifier 91, combined with the output of oscillator 93 in the first detector 92, gives a modulated intermediate-frequency wave which is increased by amplifier 94.

The variations in amplitude of the output of amplifier 94 are detected by the second detector 95, giving the modulated signal $M_1$.

The variations in amplitude of the combined signals from amplifier 94 are clipped off by limiter 96, leaving only such variations in phase as were produced in the transmitter by modulation $M_2$. The phase-sensitive detector 97 gives the modulation signal $M_2$.

Although only a few of the various forms in which this invention may be embodied have been shown herein, it is to be understood that the invention is not limited to any specific construction but may be embodied in various forms without departing from the spirit of the invention.

What is claimed is:

1. The method of relaying television-type signals over long distances, which comprises producing two or more television-type signals having normal television-signal frequencies, recording said signals electrically to make two or more records operating at normal speed carrying said signals at the original television-signal frequencies, continuously transcribing said records simultaneously at a speed lower than each of said normal speed by a predetermined ratio to produce signals for each record corresponding to said first signals but having frequencies which are lower than the original frequencies by said ratio, transmitting simultaneously by two or more channels of a multiplex radio system said last signals on a single carrier wave of a frequency lower than a normal television carrier frequency by approximately said ratio and is adapted to be transmitted over long distances, receiving and recording said signals simultaneously at a remote point to make two or more records corresponding to said first records and operating at said lower speed, transcribing said last records at a speed greater than its recording speed by the inverse of said ratio to produce derived signals having the original television-signal frequencies, modulating a carrier wave of normal television carrier frequency separately by each of said last signals, and transmitting said last modulated carrier.

2. The method set forth in claim 1 in which said two or more signals comprise separate programs.

3. The method set forth in claim 1 in which the video, synchronizing, and audio signals are recorded on separate tracks of a record and the audio signals are transmitted separately.

4. The method set forth in claim 3 in which the multiplex carrier wave is modulated by both the video signals and the synchronizing signals.

5. A system for relaying television-type signals over long distances, which comprises means for producing two or more television-type signals each having normal television signal frequencies, means for recording said signals electrically to make two or more records at normal speed carrying said signals at the original television signal frequencies, means for continuously transcribing each of said records at a lower speed to produce signals corresponding to said original signals but having frequencies which have a predetermined ratio to the original frequencies, means for transmitting simultaneously by a plurality of channels of a multiplex radio system said last signals on a single carrier wave of a frequency lower than a standard television carrier frequency by about said ratio and is adapted to be transmitted over long distances, remote means for receiving simultaneously said transmitted signals, means for recording the received signals to make two or more records at said lower speed, means for transcribing said last records at normal speed to produce signals having the original television signal frequencies, means for modulating a carrier wave of standard television carrier frequency by said last signals, and means for transmitting said last modulated carrier.

6. A system as set forth in claim 5 in which said records are made on magnetic tape.

7. A system as set forth in claim 6 in which the television-type signals include video signals, synchronizing signals, and audio signals, said signals being separated and recorded on separate tracks of said tape.

8. A system as set forth in claim 7 in which said audio signals are transmitted over a separate channel.

References Cited in the file of this patent

UNITED STATES PATENTS

| | | |
|---|---|---|
| 1,677,296 | Rosenbaum | July 17, 1928 |
| 1,735,037 | Carpe | Nov. 12, 1929 |
| 2,170,751 | Gabrilovitch | Aug. 22, 1939 |
| 2,312,835 | Hansell | Mar. 2, 1943 |
| 2,321,611 | Moynihan | June 15, 1943 |
| 2,453,773 | Young | Nov. 16, 1948 |

FOREIGN PATENTS

| | | |
|---|---|---|
| 346,456 | Great Britain | Mar. 30, 1931 |